(12) United States Patent
McNeely

(10) Patent No.: US 8,068,536 B2
(45) Date of Patent: Nov. 29, 2011

(54) ORTHOGONAL FREQUENCY DIVISION MULTIPLEXING (OFDM) DIGITAL RADIO FREQUENCY (RF) TRANSCEIVER

(75) Inventor: David Lowell McNeely, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 825 days.

(21) Appl. No.: 10/572,714

(22) PCT Filed: Sep. 25, 2003

(86) PCT No.: PCT/US03/29910
§ 371 (c)(1),
(2), (4) Date: Mar. 21, 2006

(87) PCT Pub. No.: WO2005/041458
PCT Pub. Date: May 6, 2005

(65) Prior Publication Data
US 2007/0058731 A1   Mar. 15, 2007

(51) Int. Cl.
H04B 1/38   (2006.01)
H04L 5/16   (2006.01)

(52) U.S. Cl. ........ 375/219; 375/260

(58) Field of Classification Search ........ 375/219, 375/260
See application file for complete search history.

(56) References Cited

U.S. PATENT DOCUMENTS

| 6,466,613 | B1 * | 10/2002 | Raphaeli et al. | 375/219 |
| 6,975,691 | B1 * | 12/2005 | Shiraishi | 375/329 |
| 2002/0101825 | A1 * | 8/2002 | Beck et al. | 370/252 |
| 2002/0109825 | A1 * | 8/2002 | Gui et al. | 355/53 |
| 2003/0058952 | A1 * | 3/2003 | Webster et al. | 375/260 |

OTHER PUBLICATIONS

Search Report Dated Jan. 24, 2004.

* cited by examiner

Primary Examiner — David C. Payne
Assistant Examiner — Tanmay Shah
(74) Attorney, Agent, or Firm — Robert D. Shedd; Vincent E. Duffy; Michael A. Pugel (57) ABSTRACT

A digital radio frequency (RF) transceiver circuit comprises circuitry that is adapted to select between a transmitter input signal (148) and a receiver input signal. A plurality of filters are adapted to receive either the transmitter input signal or the receiver input signal and to produce either a filtered transmitter signal or a filtered receiver signal. Circuitry alternatively receives the filtered transmitter signal or the filtered receiver signal and produces a modulated output and a demodulated output.

22 Claims, 4 Drawing Sheets

ORTHOGONAL FREQUENCY DIVISION MULTIPLEXING (OFDM) DIGITAL RADIO FREQUENCY (RF) TRANSCEIVER

This application claims the benefit under 35 U.S.C. §365 of International Application PCT/US03/29910, filed Sep. 25, 2003, which was published in accordance with PCT article 21(2) on May 6, 2005 in English.

FIELD OF THE INVENTION

The present invention relates to processing orthogonal frequency division multiplexed (OFDM) signals.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A wireless LAN (WLAN) is a flexible data communications system implemented as an alternative or extension to a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of sub-carrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage, simplified sub-channel equalization, and good interference properties.

In spite of these advantages, there are some problems with OFDM data transfer. An OFDM System generates base band symbols via a Fast Fourier Transform (FFT) that consist of many samples. The base band signal so constructed is complex (a real component and an imaginary component) and has a complex frequency content approximating (though less than), half the sampling frequency. The modulation of the base band sample data signal and subsequent demodulation of a sampled data radio frequency (RF) signal is a relatively complex process.

Known methods of digital modulation include separately up-sampling the real and imaginary components with a sample rate converter (filtering process) from a base band sampling rate, $S_0$, to a sampling rate, $S_1$, sufficient to carry the base band signal modulated on the desired carrier. The desired sample data complex carrier may be created at the sampling rate $S_1$. The real part of the base band signal is multiplied with the real part of the complex carrier (cosine) and added to the product of the imaginary part of the base band signal with the imaginary part of the complex carrier (sine) to create a real sample data RF signal. A compensated digital-to-analog (D/A) converter converts the real sample data RF signal to an analog RF signal. A method and apparatus is desirable that reduces the complexity of modulating the base band sample data signal onto a sampled data radio frequency (RF) carrier and demodulating a sampled data RF signal while maintaining fidelity.

SUMMARY OF THE INVENTION

A digital radio frequency (RF) transceiver circuit comprises circuitry that is adapted to select between a transmitter input signal and a receiver input signal. A plurality of filters are adapted to receive either the transmitter input signal or the receiver input signal and to produce either a filtered transmitter signal or a filtered receiver signal. Circuitry alternatively receives the filtered transmitter signal or the filtered receiver signal and produces a modulated output and a demodulated output.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
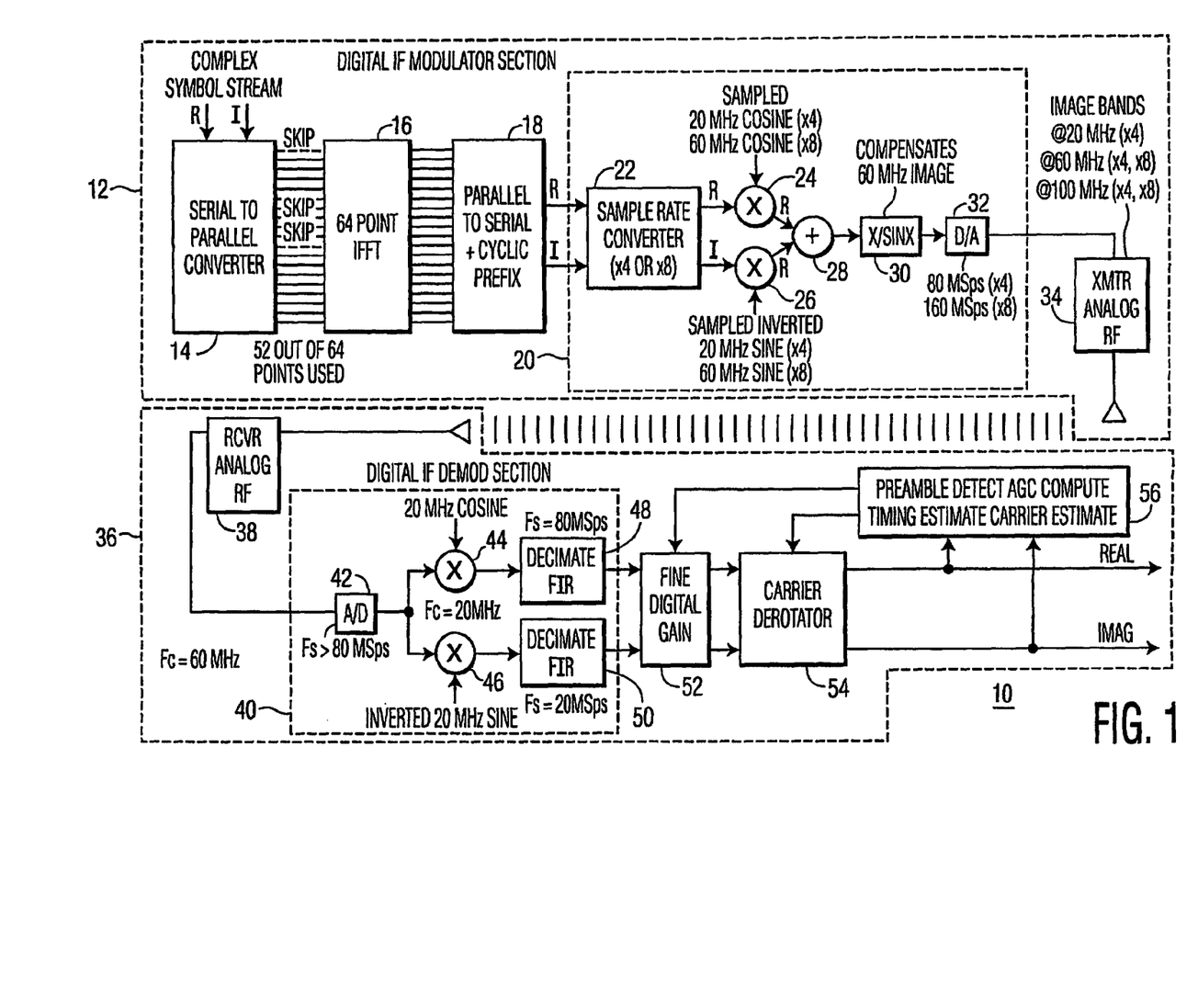
FIG. 1 is a block diagram of an exemplary OFDM transceiver in which the present invention may be employed.

FIG. 1 is a block diagram of an exemplary OFDM transceiver in which the present invention may be employed. The transceiver is generally referred to by the reference numeral 10. The transceiver 10 comprises a transmitter portion 12 (shown in dashed lines) and a receiver portion 36 (shown in dashed lines).

The transmitter portion 12 comprises a serial-to-parallel converter 14, which receives a complex symbol stream. The serial-to-parallel converter 14 delivers its output to a 64-point inverse fast Fourier transform (IFFT) circuit 16, which translates the parallelized complex symbol stream from the frequency domain into the time domain. The IFFT circuit 16 delivers its output to a parallel to serial conversion circuit 18, which may also include the capability of generating cyclic prefix information for use in subsequent transmission of a signal. The parallel to serial conversion circuit 18 delivers real and imaginary signal components to a digital intermediate frequency (IF) modulator section 20.

The digital IF modulator section 20 comprises a sample rate converter 22. The output of the sample rate converter 22 may multiply the input sample by a multiple such as four (4) or eight. The real component output of the sample rate converter 22 is delivered to a multiplier 24, which multiplies the real component by a 20 MHz cosine signal (for ×4 sampling) or a 60 MHz cosine signal (for ×8 sampling). The imaginary component output of the sample rate converter 22 is delivered to a multiplier 26, which multiplies the imaginary component by an inverted 20 MHz sine signal (for 4× sampling) or an inverted 60 MHz sine signal (for 8× sampling).

The 20 MHz and 60 MHz sampling frequencies referred to above are for purposes of example only. Those of ordinary skill in the art will appreciate that other sampling frequencies may be used.

The outputs of the multipliers 24 and 26 are delivered to a summing circuit 28. The output of the summing circuit 28 is delivered to an x/sinx circuit 30, which compensates the 60 MHz image. The output of the x/sinx circuit 30 is delivered to a D/A converter 32. The output of the D/A converter 32 is delivered to a transmitter, which transmits the signal.

In general, the carrier signal may be at a lower sample rate or it may be up-sampled and provided as an alias of the carrier signal at a frequency higher than the Nyquist frequency. The clock rate of the D/A converter 32 determines relationship between the frequencies used to modulate the complex carrier via the multipliers 24 and 26. The sample data may be modulated using a different carrier than what is desired as the output of the D/A converter 32. For example, if D/A converter clock rate divided by two (2) is greater than the desired post D/A converter frequency, then the sample data carrier will be the same frequency as the post D/A carrier. If the clock frequency of the D/A converter 32 is less than the frequency of the modulated carrier, then the sample data carrier must be an aliased carrier at a higher frequency.

By way of example, if a desired post D/A converter frequency is 60 MHz and the D/A converter is operating at an 80 MHz clock rate, the 60 MHz frequency is greater than half of the D/A converter frequency (40 MHz). In this case, samples will be from the 20 MHz carrier. When this signal is processed by the D/A converter 32, several different images will be produced. One of the images will be at the desired frequency of 20 MHz, but there will also be images at 60 MHz and 100 MHz. The 60 MHz image is one spectral fold away so its reversed spectrum must be inverted again if that image is to be used. This spectral inversion may be accomplished by a sign change of the sine component of the carrier. The 100 MHz image, on the other hand, is two spectral folds away from the 20 MHz image, so its spectrum is an expected frequency order and can stay the same (not inverted). In other words, odd spectral folds reverse, but even spectral folds maintain their frequency order. Correct reception of an OFDM signal requires accounting for this spectral inversion.

In an exemplary embodiment of the present invention, the RF signal carrier of the pre-D/A sample data has a frequency equal to the D/A clock rate divided by four (4). The post-D/A analog RF signal carrier is three-fourths (¾) of the D/A clock rate. Images at the clock rate divided by 4 and at five-fourths (⁵⁄₄) of the clock rate (and above) are removed by analog filtering. Choice of another image as the desired RF signal merely requires choice of the appropriate sign of the sin modulator. There are different gains for different images due to the D/A filter response, which must be accommodated via downstream analog processing.

The receiver portion 36 comprises a receiver 38, which receives transmitted RF OFDM signals. The received signal is delivered to a digital IF demodulation section 40 for further processing. The digital IF demodulation section 40 comprises an analog-to-digital (A/D) converter 42, which breaks the received signal into constituent real and imaginary components. The real component is delivered to a multiplier 44, which multiplies it by a 20 MHz cosine signal and delivers the result to a decimate finite impulse response filter (FIR) 48. The imaginary component of the output of the A/D converter 42 is delivered to a multiplier 46, which multiplies it by an inverted 20 MHz sine signal and delivers the result to a decimate FIR filter 50.

The conventional process of digital demodulation is to A/D convert a real signal at a sufficient sample rate to preserve the modulation. In accordance with embodiments of the present invention, a 60 MHz intermediate frequency (IF) signal is sampled at 80 MSps with a sample and hold circuit with a narrow aperture. This held sample is A/D converted to an 8-bit integer number. The 60 MHz IF pre-A/D signal appears as a post-D/A 20 MHz IF signal due to spectral folding. The real signal is multiplied by a complex exponential matching the frequency of the RF carrier or, in the case of the exemplary embodiment shown in FIG. 1, a folded version of the RF carrier. This will create an over-sampled complex base band signal, which is anti-alias filtered and sub-sampled to the OFDM FFT rate.

The outputs of the FIR filters 48 and 50 are delivered to a fine digital gain circuit 52. The output of the fine digital gain circuit 52 is delivered to a carrier derotator 54, which delivers real and imaginary data components for further processing. The real and imaginary components are additionally provided to a feedback circuit 56, which may provide preamble detection, automatic gain control (AGC) computation, timing estimation and carrier estimation functionality. The output of the feedback circuit 56 is provided to the carrier derotator 54 and the fine digital gain circuit 52.

Figure 2:
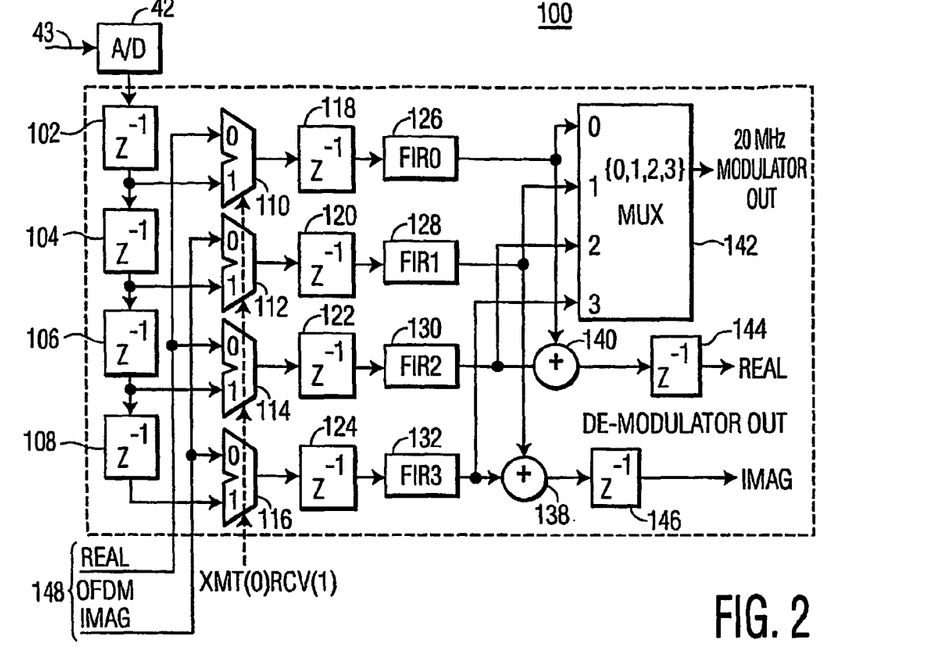
FIG. 2 is a block diagram of a transceiver circuit according to an embodiment of the present invention.

FIG. 2 is a block diagram of a transceiver circuit according to an embodiment of the present invention. The transceiver circuit is generally referred to by the reference numeral 100. Those of ordinary skill in the art will appreciate that, in the embodiment shown in FIG. 2, most of circuit may be operated at a lower frequency (e.g. 20 MHz) even though an output signal of 60 MHz is desired. This results in efficiency of power consumption when the circuit is receiving and transmitting.

The circuitry shown in FIG. 2 may be substituted into the transceiver 10 (FIG. 1) to improve the reuse of components between the receiver and transmitter sections of the transceiver 10. Specifically, the filter circuitry shown in FIG. 2 may be substituted for the sample rate converter 22 and the multipliers 24 and 26 of FIG. 1 if the sample rate is chosen to be four (4) times the symbol rate. This substitution provides a transceiver circuit that operates mostly at a lower frequency to conserve power while providing a signal in a higher frequency range. Additionally, reuse of the circuitry in accordance with embodiments of the present invention reduces hardware growth. In other cases, an up-sampler may be used in conjunction with a Nyquist modulator to move the sample frequencies to a desired position in a frequency spectrum without generating undesirable sidebands.

The transmitter portion of the circuitry set forth in FIG. 2 employs at least two separate mechanisms to deliver digital content into a desired IF band. First, a complex data signal is modulated into a real-valued IF signal. Second, up-sampling is combined with Nyquist modulation. The effect of these two mechanisms is to provide output signals having two distinct sample data rates. The relationship between the two sample data rates is expressed as follows:

$$IF_2 = (\text{sample rate of output modulator}/2) - IF_1$$

where $IF_2$ is the sample rate frequency of the output of the up-sampler modulator and $IF_1$ is the sample rate frequency of the first modulator (the input to the up-sampler modulator).

The transceiver comprises the A/D converter 42 (FIG. 1), which may sample data at a rate of at least 80 MSps. The A/D converter 42 receives a received signal 43. The output of the A/D converter 42 is delivered to a series of delay lines 102, 104, 106 and 108. Each of the delay lines 102, 104, 106 and 108 comprise an 80 MSps sample delay. The delay lines 102, 104, 106 and 108 may comprise DFF arrays.

The output of the delay lines 102, 104, 106 and 108 are provided, respectively, to the zero (0) inputs of a plurality of 2-input multiplexers 110, 112, 114 and 116. The real component of an OFDM data stream, which may be provided by the parallel to serial conversion circuit 18 (FIG. 1), is delivered to the one (1) input of the multiplexer 110 and the multiplexer 114. The imaginary component of an OFDM data stream, which may be provided by the parallel to serial conversion circuit 18 (FIG. 1), is delivered to the one (1) input of the multiplexer 112 and the multiplexer 116. The real and imaginary components of the OFDM data stream may be collectively referred to as a transmitted signal 148. The multiplexers 110, 112, 114 and 116 may be connected to control circuitry 117 that selects the 0 input when the transceiver is in transmit mode and the 1 input when the transceiver is in the receive mode.

The output of the multiplexers 110, 112, 114 and 116 is delivered, respectively, a plurality of delay lines 118, 120, 122 and 124. Each of the delay lines 118, 120, 122 and 124 comprise a 20 MSps sample delay. The delay lines 118, 120, 122 and 124 may comprise DFF arrays. The output of the delay lines 118, 120, 122 and 124 is delivered, respectively, to a plurality of FIR filters 126, 128, 130 and 132.

The FIR filters 126, 128, 130 and 132 may comprise the tap coefficients set forth in Table 1:

delay less than the prefix length, any filtering affects this budget (mixing of symbols across the prefix) thus reducing the prefix efficacy in giving multipath immunity. Those of ordinary skill in the art will appreciate that other tap values may be chosen, which will facilitate the goal of removing undesirable aliased image copies and ensuring that the polarity of the output is correct (i.e., the output spectrum is not inverted).

Those of ordinary skill in the art will similarly appreciate that other filter types besides FIR filters may be employed to implement the present invention. For example, infinite impulse response (IIR) filters may also be employed. The impulse response values shown in Table 1, for example, may be used to implement an IIR filter configuration according to the present invention.

The outputs of the FIR filters 126, 128, 130 and 132 are delivered to the inputs of a four (4)-input multiplexer 142. The output of the multiplexer 142, which may comprise a 20 MHz modulator output, may be delivered for further processing prior to being transmitted.

The outputs of the FIR filters 126 and 130 are delivered to a summing circuit 140. The outputs of the FIR filters 128 and 132 are delivered to a summing circuit 138. The output of the summing circuit 140 is delivered to a delay line 144, which produces a real component of a demodulated signal for further processing. The output of the summing circuit 138 is delivered to a delay line 146, which produces an imaginary component of a demodulated signal for further processing.

Figure 3:
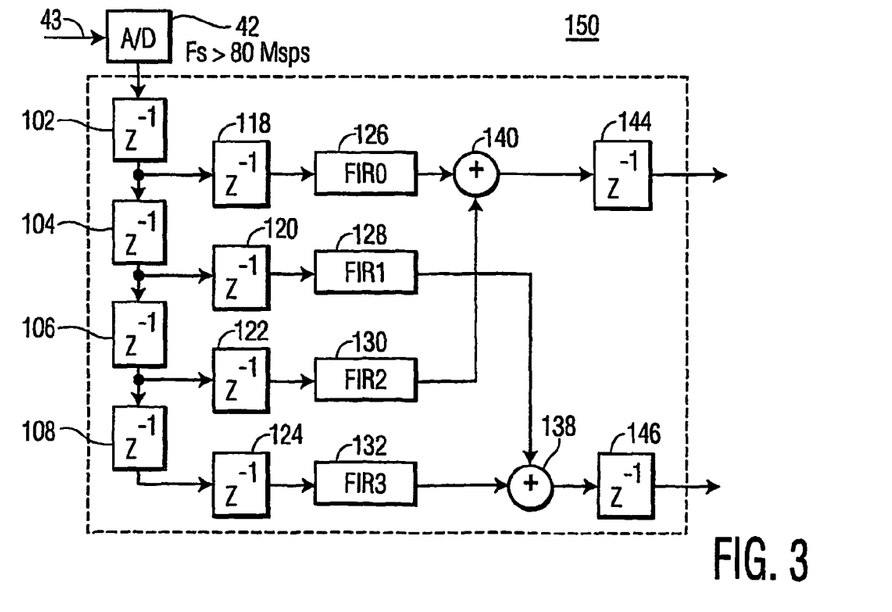
FIG. 3 is a block diagram of a receiver circuit according to an embodiment of the present invention.

FIG. 3 is a block diagram of a receiver circuit according to an embodiment of the present invention. The receiver circuit, which is generally referred to by the reference numeral 150, comprises the portions of the transceiver circuit 100 that are used in processing received (as opposed to transmitted) OFDM data.

Figure 4A:
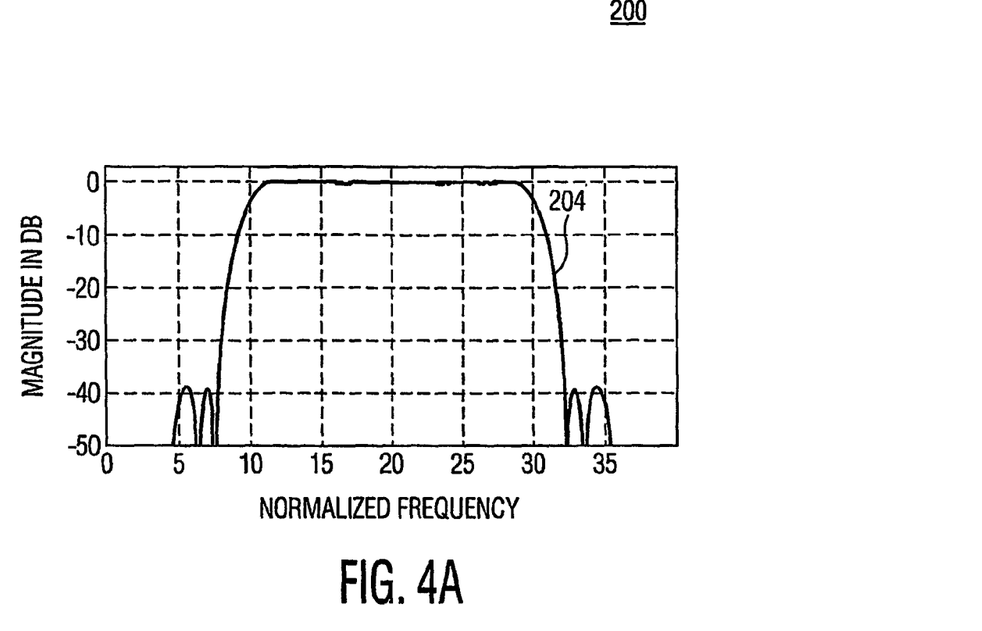
FIG. 4 is a graph showing a representative frequency response and associated normalized pass band frequency response for an exemplary 80 million samples per second (MSps) transceiver block according to an embodiment of the present invention.
Figure 4B:
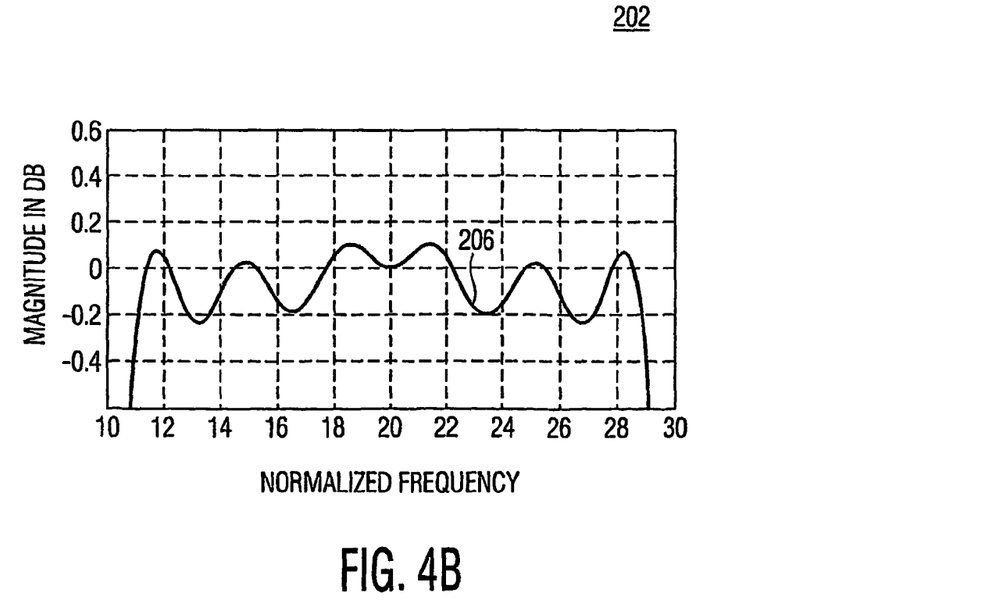

FIG. 4 is a graph showing a representative frequency response and associated normalized pass band frequency response for an exemplary 80 MSps transceiver block according to an embodiment of the present invention. The frequency response data illustrated in FIG. 4 is illustrative of an 80 MSps transceiver block assuming the representative filter coefficients of Table 1.

The x-axis of the graph shown in FIG. 4 corresponds to normalized frequency and the y-axis corresponds to magnitude of response. The frequency response and associated pass bands shown in FIG. 4 may correspond to output produced by the transceiver block 100 (FIG. 2). A first graph portion 200

TABLE 1

| Representative Filter Impulse Responses {Row Sums = ±256} | | | | | | | | | | | | |
|---|---|---|---|---|---|---|---|---|---|---|---|---|
| | 1 | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
| FLTR0 | 0 | −4 | 7 | −9 | 12 | −12 | 268 | −12 | 12 | −9 | 7 | −4 |
| FLTR1 | 1 | 0 | 2 | −8 | 19 | −65 | −238 | 50 | −28 | 16 | −10 | 5 |
| FLTR2 | 3 | −6 | 12 | −24 | 47 | −160 | −160 | 47 | −24 | 12 | −6 | 3 |
| FLTR3 | −5 | 10 | −16 | 28 | −50 | 238 | 65 | −19 | 8 | −2 | 0 | −1 |

The FIR filters 126, 128, 130 and 132 may be implemented in such a way that outer symmetric columns of Table 1 can be dropped from the sum thereby implementing a 12 tap, 10 tap, or 8 tap FIR filters. This allows a design trade off between inter-symbol interference and frequency selectivity. Higher selectivity (more taps) may be used when interchannel interference limits performance. Less sensitivity but higher multipath immunity (less taps) may be chosen when longer multipath conditions limit performance.

The tap values shown in Table 1 are for purposes of illustration only. In an OFDM system in which a prefix length gives immunity against multipath interference having time shows a signal trace 204, which corresponds to the normalized frequency response of the transceiver block. A second graph portion 202 shows a signal trace 206, which corresponds to the pass band frequency response of the signal trace 204.

Figure 5A:
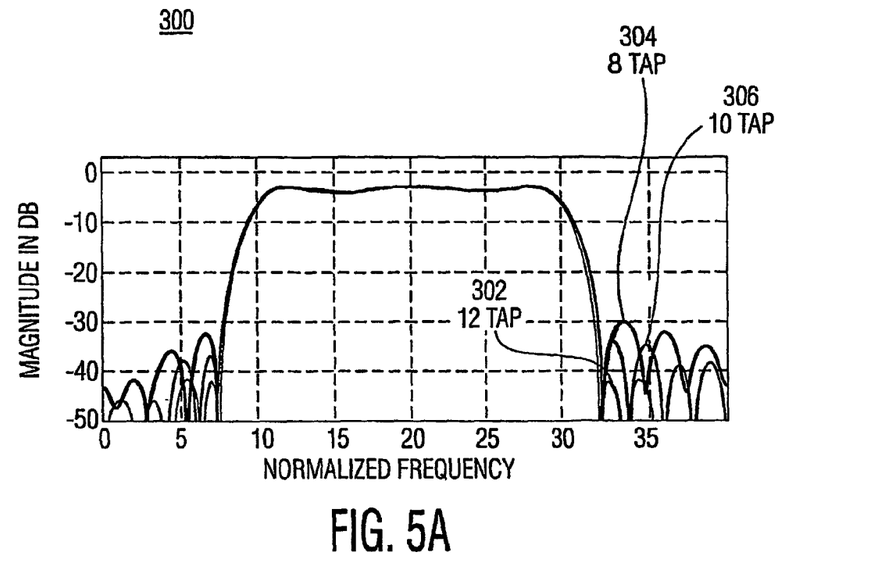
FIG. 5 is a graph showing the frequency response of different impulse response extents and associated normalized pass band frequency responses according to an embodiment of the present invention.
Figure 5B:
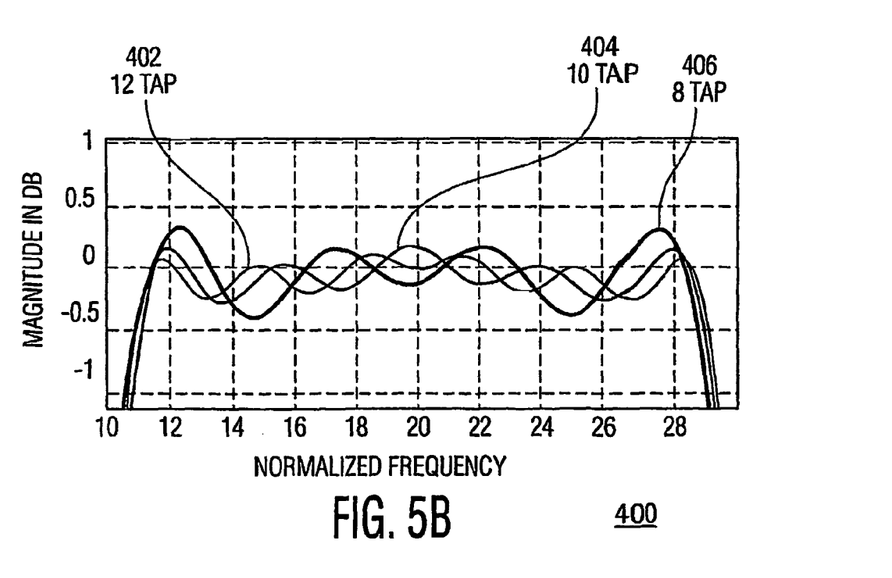

FIG. 5 is a graph showing the frequency response of different impulse response extents and associated normalized pass bands according to an embodiment of the present invention. The x-axis of the graph shown in FIG. 5 corresponds to normalized frequency and the y-axis corresponds to magnitude of response. A first graph portion 300 shows a signal trace 302 (corresponding to a 12-tap filter output), a signal trace 304 (corresponding to an 8-tap filter output and a signal trace 306 (corresponding to a 10-tap filter output. The signal traces 302, 304 and 306 represent normalized frequency responses.

A second graph portion 400 shows a signal trace 402 (corresponding to a 12-tap filter output), a signal trace 404 (corresponding to a 10-tap filter output) and a signal trace 406 (corresponding to an 8-tap filter output). The signal traces 402, 404 and 406 represent pass band frequency responses.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A digital radio frequency (RF) transceiver circuit, comprising:
   a converter circuit that samples a receiver input signal;
   circuitry that is adapted to select between a transmitter input signal and the sampled receiver input signal, the transmitter input signal including a real portion and an imaginary portion;
   a filter, the filter being adapted to receive both the transmitter input signal and the sampled receiver input signal, the filter adapted to produce either a filtered transmitter signal or a filtered receiver signal, the filter further including at least two filter elements operating in parallel; and
   circuitry that alternatively receives the filtered transmitter signal or the filtered receiver signal and produces a modulated output and a demodulated output, the demodulated output including a real portion and an imaginary portion,
   wherein the filter operates at a sampling frequency that is lower than the sampling frequency of the converter and the circuitry that produces the modulated output.

2. The RF transceiver circuit set forth in claim 1, wherein the filter comprises four filters that employ impulse response characteristics set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|----|----|-----|-----|------|------|-----|-----|-----|-----|-----|
| FLTR0 | 0  | −4 | 7  | −9  | 12  | −12  | 268  | −12 | 12  | −9  | 7   | −4  |
| FLTR1 | 1  | 0  | 2  | −8  | 19  | −65  | −238 | 50  | −28 | 16  | −10 | 5   |
| FLTR2 | 3  | −6 | 12 | −24 | 47  | −160 | −160 | 47  | −24 | 12  | −6  | 3   |
| FLTR3 | −5 | 10 | −16| 28  | −50 | 238  | 65   | −19 | 8   | −2  | 0   | −1. |

3. The RF transceiver circuit set forth in claim 1, wherein the filter comprise finite impulse response (FIR) filters.

4. The RF transceiver circuit set forth in claim 3, wherein the filter comprises four filters that employ tap coefficient values set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|----|-----|-----|-----|------|------|-----|-----|-----|-----|-----|
| FLTR0 | 0  | −4 | 7   | −9  | 12  | −12  | 268  | −12 | 12  | −9  | 7   | −4  |
| FLTR1 | 1  | 0  | 2   | −8  | 19  | −65  | −238 | 50  | −28 | 16  | −10 | 5   |
| FLTR2 | 3  | −6 | 12  | −24 | 47  | −160 | −160 | 47  | −24 | 12  | −6  | 3   |
| FLTR3 | −5 | 10 | −16 | 28  | −50 | 238  | 65   | −19 | 8   | −2  | 0   | −1. |

5. The RF transceiver circuit set forth in claim 1, wherein the RF transceiver circuit comprises a portion of an orthogonal frequency division multiplexing (OFDM) transceiver.

6. The RF transceiver circuit set forth in claim 1, wherein outputs from at least a portion of the plurality of filters are delivered as inputs to a multiplexer that provides the modulated output.

7. The RF transceiver circuit set forth in claim 1, wherein the modulated output is processed by a digital-to-analog (D/A) converter at a frequency four times greater than a frequency of a carrier of the modulated output.

8. The RF transceiver circuit set forth in claim 1, wherein the receiver input signal is processed with a delay line having a plurality of output delays, each of the output delays corresponding to one of the plurality of filters and wherein each of the plurality of filters has a different delay characteristic that compensates the associated output delay.

9. A digital radio frequency (RF) transceiver circuit, comprising:
   means for sampling a receiver input signal;
   means for selecting between a transmitter input signal and the sampled receiver input signal, the transmitter input signal including a real portion and an imaginary portion;
   means for receiving either the transmitter input signal or the receiver input signal and for producing either a transmitter signal or a receiver signal; and
   means for alternatively receiving the transmitter signal or the receiver signal and for producing a modulated output and a demodulated output, the demodulated output including a real portion and an imaginary portion, wherein the means for receiving includes means for processing both the transmitter input signal and the receiver input signal in a filter at a sampling frequency that is lower than the sampling frequency in the means for sampling, the filter further including at least two filter elements operating in parallel.

10. The RF transceiver circuit set forth in claim 9, wherein the means for receiving either the transmitter input signal or the receiver input signal and for producing either a transmitter signal or a receiver signal comprising four filters that employ impulse response characteristics set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|------|------|------|------|------|------|------|------|------|-------|-------|
| FLTR0 | 0  | −4   | 7    | −9   | 12   | −12  | 268  | −12  | 12   | −9   | 7     | −4    |
| FLTR1 | 1  | 0    | 2    | −8   | 19   | −65  | −238 | 50   | −28  | 16   | −10   | 5     |
| FLTR2 | 3  | −6   | 12   | −24  | 47   | −160 | −160 | 47   | −24  | 12   | −6    | 3     |
| FLTR3 | −5 | 10   | −16  | 28   | −50  | 238  | 65   | −19  | 8    | −2   | 0     | −1.   |

11. The RF transceiver circuit set forth in claim 9, wherein the means for receiving either the transmitter input signal or the receiver input signal and for producing either a transmitter signal or a receiver signal plurality of filters comprise a plurality of finite impulse response (FIR) filters.

12. The RF transceiver circuit set forth in claim 11, wherein the plurality of FIR filters comprises four FIR filters that employ tap coefficient values set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|------|------|------|------|------|------|------|------|------|-------|-------|
| FLTR0 | 0  | −4   | 7    | −9   | 12   | −12  | 268  | −12  | 12   | −9   | 7     | −4    |
| FLTR1 | 1  | 0    | 2    | −8   | 19   | −65  | −238 | 50   | −28  | 16   | −10   | 5     |
| FLTR2 | 3  | −6   | 12   | −24  | 47   | −160 | −160 | 47   | −24  | 12   | −6    | 3     |
| FLTR3 | −5 | 10   | −16  | 28   | −50  | 238  | 65   | −19  | 8    | −2   | 0     | −1.   |

13. The RF transceiver circuit set forth in claim 9, wherein the RF transceiver circuit comprises a portion of an orthogonal frequency division multiplexing (OFDM) transceiver.

14. The RF transceiver circuit set forth in claim 9, wherein the means for alternatively receiving the transmitter signal or the receiver signal and for producing a modulated output and a demodulated output comprises a multiplexer that provides the modulated output.

15. The RF transceiver circuit set forth in claim 9, wherein the modulated output is processed by a digital-to-analog (D/A) converter at a frequency four times greater than a frequency of a carrier of the modulated output.

16. The RF transceiver circuit set forth in claim 9, wherein the means for receiving either the transmitter input signal or the receiver input signal and for producing either a transmitter signal or a receiver signal comprises a plurality of filters and wherein the receiver input signal is processed with a delay line having a plurality of output delays, each of the output delays corresponding to one of the plurality of filters and wherein each of the plurality of filters has a different delay characteristic that compensates the associated output delay.

17. A method of processing signals in a digital radio frequency (RF) transceiver circuit, the method comprising:
sampling a receiver input signal;
selecting between a transmitter input signal and the sampled receiver input signal, the transmitter input signal including a real portion and an imaginary portion;
receiving either the transmitter input signal or the receiver input signal and producing either a filtered transmitter signal or a filtered receiver signal; and
alternatively receiving the filtered transmitter signal or the filtered receiver signal and producing a modulated output and a demodulated output, the demodulated output including a real portion and an imaginary portion, wherein the step of receiving includes processing both the transmitter input signal and the receiver input signal in a filter at a sampling frequency that is lower than the sampling frequency in the sampling step, the filter further including at least two filter elements operating in parallel.

18. The method set forth in claim 17, comprising alternatively processing the transmitter input signal or the receiver input signal with at least four filters that employ tap coefficient values set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|------|------|------|------|------|------|------|------|------|-------|-------|
| FLTR0 | 0  | −4   | 7    | −9   | 12   | −12  | 268  | −12  | 12   | −9   | 7     | −4    |
| FLTR1 | 1  | 0    | 2    | −8   | 19   | −65  | −238 | 50   | −28  | 16   | −10   | 5     |
| FLTR2 | 3  | −6   | 12   | −24  | 47   | −160 | −160 | 47   | −24  | 12   | −6    | 3     |
| FLTR3 | −5 | 10   | −16  | 28   | −50  | 238  | 65   | −19  | 8    | −2   | 0     | −1.   |

19. The method set forth in claim 17, comprising creating the transmitter input signal and the receiver input signal using an orthogonal frequency division multiplexing (OFDM) strategy.

20. The method set forth in claim 17, comprising processing the modulated output using a digital-to-analog (D/A) converter at a frequency four times greater than a frequency of a carrier of the modulated output.

21. A digital radio frequency (RF) transceiver circuit, comprising:

circuitry that is adapted to select between a transmitter input signal and a receiver input signal;

a plurality of filters that are adapted to receive either the transmitter input signal or the receiver input signal and to produce either a filtered transmitter signal or a filtered receiver signal; and circuitry that alternatively receives the filtered transmitter signal or the filtered receiver signal and produces a modulated output and a demodulated output, wherein the plurality of filters employ impulse response characteristics set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|----|-----|-----|-----|------|------|------|-----|-----|-----|-----|
| FLTR0 | 0  | -4 | 7   | -9  | 12  | -12  | 268  | -12  | 12  | -9  | 7   | -4  |
| FLTR1 | 1  | 0  | 2   | -8  | 19  | -65  | -238 | 50   | -28 | 16  | -10 | 5   |
| FLTR2 | 3  | -6 | 12  | -24 | 47  | -160 | -160 | 47   | -24 | 12  | -6  | 3   |
| FLTR3 | -5 | 10 | -16 | 28  | -50 | 238  | 65   | -19  | 8   | -2  | 0   | -1. |

22. A method of processing signals in a digital radio frequency (RF) transceiver circuit, the method comprising:
  selecting between a transmitter input signal and a receiver input signal;
  receiving either the transmitter input signal or the receiver input signal and producing either a filtered transmitter signal or a filtered receiver signal;
  alternatively receiving the filtered transmitter signal or the filtered receiver signal and producing a modulated output and a demodulated output, and
  wherein the step of receiving further includes the step of processing either the transmitter input signal or the receiver input signal with at least four filters that employ tap coefficient values set forth below:

|       | 1  | $z^{-1}$ | $z^{-2}$ | $z^{-3}$ | $z^{-4}$ | $z^{-5}$ | $z^{-6}$ | $z^{-7}$ | $z^{-8}$ | $z^{-9}$ | $z^{-10}$ | $z^{-11}$ |
|-------|----|----|-----|-----|-----|------|------|------|-----|-----|-----|-----|
| FLTR0 | 0  | -4 | 7   | -9  | 12  | -12  | 268  | -12  | 12  | -9  | 7   | -4  |
| FLTR1 | 1  | 0  | 2   | -8  | 19  | -65  | -238 | 50   | -28 | 16  | -10 | 5   |
| FLTR2 | 3  | -6 | 12  | -24 | 47  | -160 | -160 | 47   | -24 | 12  | -6  | 3   |
| FLTR3 | -5 | 10 | -16 | 28  | -50 | 238  | 65   | -19  | 8   | -2  | 0   | -1. |

\* \* \* \* \*